United States Patent [19]

Nakamori et al.

[11] Patent Number: 4,740,948
[45] Date of Patent: Apr. 26, 1988

[54] DISC CARTRIDGE

[75] Inventors: Yoshiyuki Nakamori, Yuki; Seiichi Matsushima, Niihari; Yasunori Kanazawa, Hachioji; Mitsuyoshi Koyama, Yuki; Shinichi Abe, Ashigarakami; Nobuyuki Fujimoto, Odawara, all of Japan

[73] Assignees: Hitachi Maxwell, Ltd., Osaka; Hitachi, Ltd., Tokyo, both of Japan

[21] Appl. No.: 861,421

[22] Filed: May 9, 1986

[30] Foreign Application Priority Data

May 11, 1985 [JP] Japan ................... 60-100021

[51] Int. Cl.⁴ .......................................... G11B 23/04
[52] U.S. Cl. ................... 369/291; 206/312; 206/444; 360/133
[58] Field of Search ............... 369/291, 273; 206/312, 206/444; 360/133

[56] References Cited

U.S. PATENT DOCUMENTS

| 4,443,874 | 4/1984 | Steenberg | 206/312 |
| 4,608,681 | 8/1986 | Shiosaki | 369/291 |
| 4,614,990 | 9/1986 | Saito | 206/444 |

FOREIGN PATENT DOCUMENTS

| 0079110 | 5/1983 | European Pat. Off. . |
| 0133734 | 3/1985 | European Pat. Off. . |
| 0137965 | 4/1985 | European Pat. Off. . |
| 2529701 | 1/1984 | France . |
| 2163887 | 3/1986 | United Kingdom ........ 206/312 |

OTHER PUBLICATIONS

Patent Abstracts of Japan, vol. 6, No. 209 (P-150), (1087), Oct. 21, 1982.
Patent Abstracts of Japan, vol. 8, No. 65 (P-263), (1502), Mar. 27, 1984.

Primary Examiner—Steven L. Stephan
Attorney, Agent, or Firm—Birch, Stewart, Kolasch & Birch

[57] ABSTRACT

A disc cartridge comprising a cartridge case, a magnetic recording disc rotatably mounted in the cartridge case, and head insertion openings formed extending to the side portions of the cartridge case, the openings being opened even at one edge of the cartridge case for facilitating insertion of the head mounted in a recording and play back device, the cartridge case being reinforced by at least one reinforcement member having a smaller diameter or a smaller thickness than the thickness of the cartridge case.

24 Claims, 9 Drawing Sheets

Fig. 9
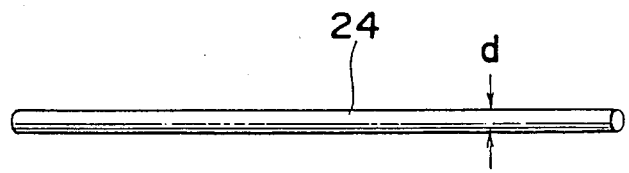
Fig. 10
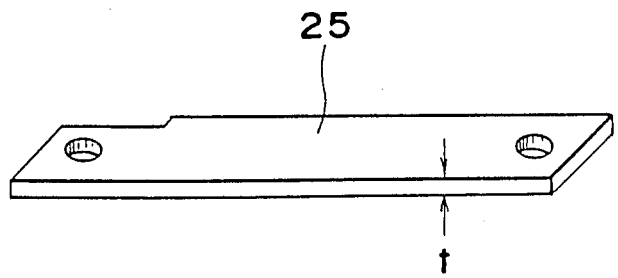
Fig. 11
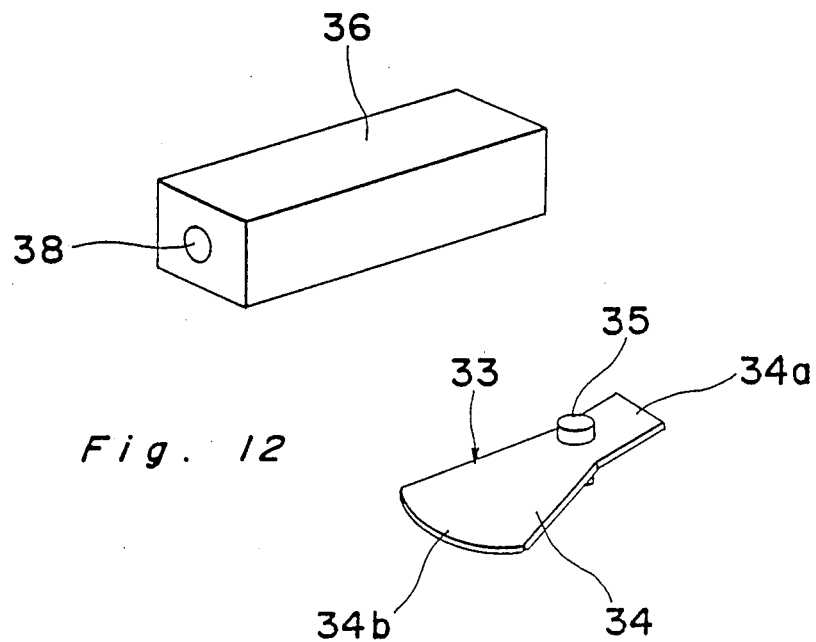
Fig. 12

DISC CARTRIDGE

BACKGROUND OF THE INVENTION

1. Field of the Invention

The present invention relates to a disc cartridge comprising a recording disc rotatably enclosed in the cartridge, and more particularly to a disc cartridge mounted in a recording and play back device for recording and reproducing information.

2. Description of the Related Art

There is provided an optical magnetic disc into which an information signal can be repeatedly erased and rewritten using the thermal magnetic effect. In a production method of the optical magnetic disc, a pair of resin layers, wherein guide grooves for tracking and pits for addressing track addresses are formed, are transferred onto the surfaces of a pair of transparent substrates made of material such as glass etc., and a pair of vertical magnetic recording media, such as a sort of amorphous film, are respectively formed on the surfaces of the resin layers. An information signal can be erased and written into the vertical magnetic recording medium using the thermal magnetic effect.

The writing and erasing process into the optical magnetic disc will be described below. As shown in FIG. 1(a), a current flows through a magnetic coil 50 and a vertical magnetic recording medium is magnetized at a magnetic field intensity H in a predetermined magnetization direction. Next, as shown in FIG. 1(b), a laser light is radiated onto a recording portion of the vertical magnetic recording medium by a laser head 52 so as to heat the recording portion up to around Curie temperature, thereby the magnetization direction M is reversed by the thermal magnetic effect. The plane of the direct line polarization of the laser light is rotated by the Kerr effect when the laser light is reflected on the magnetic pole, wherein the rotation direction of the plane of the polarization depends on the magnetization direction M.

As shown in FIG. 2, a laser light emitted by a laser 56 is split by beam spliters 57 and 58 and received by an optical signal detecting system 59, on the other hand, the laser light with a rotated plane of the polarization passes through an analyser 54 into an optical detector 55, the optical detector 55 detecting the strength of the laser light directly proportional to the rotation angle of the plane of the polarization.

Referring back to FIG. 1(c), if the magnetization direction M of the vertical magnetic recording medium is rotated by a pattern corresponding to a predetermined information signal, each of the rotated or non-rotated portions of the magnetization direction in the vertical magnetic recording medium can be used as a bit for recording an information signal. On the contrary, the portion of the vertical magnetic recording medium where the magnetization direction is rotated in the opposite direction −M to a predetermined reference magnetization direction M, is magnetized in the opposite magnetization direction to the magnetized direction −M, heating the portion up to the Curie temperature, thereby the magnetization direction of the portion of the vertical magnetic recording medium become the reference magnetization direction M, resulting in the fact that the information signal of the portion of the vertical magnetic recording medium can be erased.

Therefore, as described above, an electromagnetic coil 50 for magnetizing the vertical magnetic recording medium at a predetermined magnetization intensity H and a laser head 52 for heating the vertical magnetic recording medium 51 up to the Curie temperature are required in the recording and play back device for the aforementioned optical magnetic disc. The electromagnetic coil 50 and the laser head 52 can be arranged side by side at the one side of the optical magnetic disc, however, from the view point of the ease of the production of recording and play back device, the laser head 52 is preferably arranged facing the bottom surface of the optical magnetic disc 60 and the electromagnetic coil 50 is preferably arranged facing the top surface of the optical magnetic disc 60, as shown in FIG. 2.

FIG. 3 shows a conventional disc cartridge rotatably comprising the aforementioned optical magnetic disc which was laid open in the Japanese Provisional Publication No. 150963/1983. In FIG. 3, there is provided a cartridge case 61 made of a synthetic resin, and an optical magnetic disc 60 rotatably arranged in the cartridge case 61, and a shutter 63 provided for opening and shutting a spindle insertion hole 66 and a head insertion hole 67, wherein the spindle insertion hole 66 and the head insertion hole 67 are formed on the surface of the cartridge case 61 as described below in detail.

As shown in FIGS. 3 and 4, the cartridge case 61 is a combination of a top half 64 and a bottom half 65 in the shape of a shallow square shape dish by facing the top and bottom halves 64 and 65 together, the aforementioned optical magnetic disc 60 and the other component member are arranged in a spacing formed in the inside of the cartridge case 61. The circular spindle insertion hole 66 is formed around the center portion of the top and the bottom halves 64 and 65 corresponding to the rotation center of the optical magnetic disc 60, and the head insertion hole 67 is formed at the portion extending in a radial direction from the outside of the spindle insertion hole 66 to the side rim portion of the cartridge case 61. A connecting portion 69 is formed between the side rim portion 68 of the cartridge case 61 at the insertion side into the recording and playing back device, corresponding the front rim portions of the top and the bottom halves 64 and 65, and the end portion 67a of the head insertion hole 67, and the shutter 63 is slidably arranged along the recess groove 70, formed in the shape of a direct line at the connection portion 69. The explanation of the details of the structure of the shutter 63 is omitted because the structure of the shutter 63 is not directly associated with the subject matter of the present invention.

In the aforementioned conventional disc cartridge 61, the shutter 63 is opened upon the insertion of the disc cartridge 61 into the recording and playing back device, and a spindle mounted in the recording and play back device is inserted into the spindle insertion hole 66, resulting in that the optical magnetic disc 60 is rotatably supported by the spindle. Next, as shown in FIG. 4, the electromagnetic coil 50 and the laser head 52 are inserted from the outside of the head insertion hole 67 formed on the surface of the top and bottom halves 64 and 65 into the portion facing the top and the bottom surfaces of the aforementioned optical magnetic disc 60, thereby the recording and playing back operations can be performed.

In the aforementioned conventional disc cartridge, the method for arranging the electromagnetic coil 50 and the laser head 52 at a predetermined position facing the optical magnetic disc 60 has been adopted as follows, since the connecting portion 69 is formed at the side rim portion 68 of the top and bottom halves 64 and 65. As shown in FIG. 5, the electromagnetic coil 50 and the laser head 52 must be arranged so as to move up and down for facing the optical magnetic disc 60 in the recording and playing back device, thus, the cartridge case 61 is inserted between the electromagnetic coil 50 and the laser head 52 on the condition that the electromagnetic coil 50 and the laser head 52 are arranged at a predetermined spacing. After that, as shown in FIG. 4, it is necessary to insert the electromagnetic coil 50 and the laser head 52 into the inside of the cartridge case 61 so that the electromagnetic coil 50 and the laser head 52 face the optical magnetic disc 60. Therefore, there is a problem that the recording and playing back device become relatively large since the carrying mechanism for supporting and moving the electromagnetic coil 50 and the laser head 52 is complicated. A further problem is in that the electromagnetic coil 50 and the laser head 52 can not be positioned precisely with respect to the optical magnetic disc 60.

SUMMARY OF THE INVENTION

An essential object of the present invention is to provide a disc cartridge which can overcome the aforementioned problems, more particularly, to provide a disc cartridge for which a recording and play back device can be made smaller than conventional recording and playing back devices, and which comprises a rotatable optical magnetic disc to which an electromagnetic coil and a laser head can be positioned precisely in a recording and playing back device.

According to the present invention, there is provided a disc cartridge comprising a cartridge case formed by combining a top and a bottom half, a disc shaped recording medium rotatably mounted between the top and the bottom halves, elongated head insertion openings formed in each of the bottom and top halves extending to an edge of each half defining an open space on the respective edge to provide a pair of sub portions of each half on both sides in each head insertion opening, a spindle insertion hole formed at a center portion of each of the top and bottom halves, a shutter means mounted to the cartridge case for opening and shutting the head insertion openings and the spindle insertion holes, and at least one reinforcement member having a diameter or a thickness smaller than the thickness of the cartridge case, the reinforcement member being mounted between the sub portions of the top and bottom halves across the open space at the edge.

Accordingly, there can be provided a disc cartridge for which a recording and play back device can be made smaller than a conventional recording and play back device, and comprising a rotatable optical magnetic disc to which an electromagnetic coil and a laser head can be positioned precisely in a recording and play back device.

BRIEF DESCRIPTION OF THE DRAWINGS

FIG. 9 is a perspective view of a first reinforcement member of the disc cartridge shown in FIG. 6, FIG. 10 is a perspective view of a second reinforcement member of the disc cartridge shown in FIG. 6, FIG. 11 is a perspective view of a slider of the disc cartridge shown in FIG. 6, FIG. 12 is a perspective view of a write protector of the disc cartridge shown in FIG. 6, FIGS. 13 and 14 are partial plane views of the bottom half shown in FIG. 7 showing the operation of the write protector shown in FIG. 12.

DESCRIPTION OF THE PREFERRED EMBODIMENTS

Figure 1A:
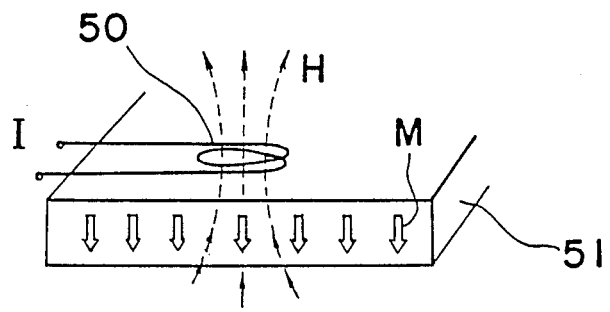
FIGS. 1(a), 1(b) and 1(c) are views of conventional optical magnetic discs showing the principle of recording and erasing an information signal in the conventional optical magnetic disc.
Figure 1B:
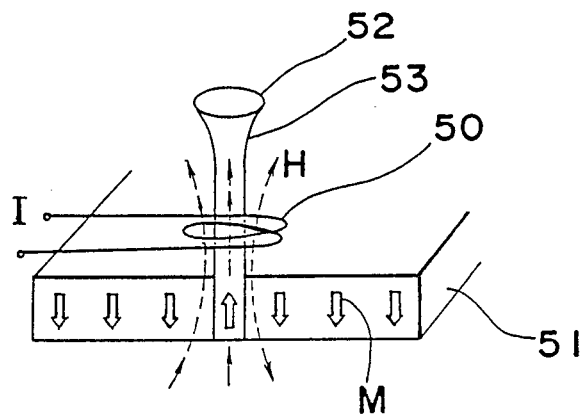
Figure 1C:
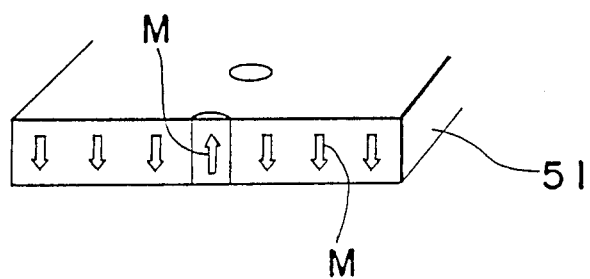
Figure 2:
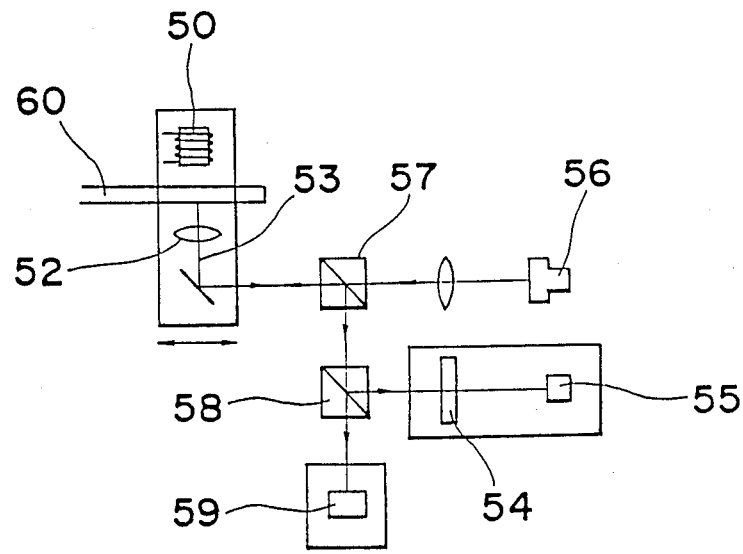
FIG. 2 is a schematic diagram of a signal detecting system for a conventional optical magnetic disc.
Figure 3:
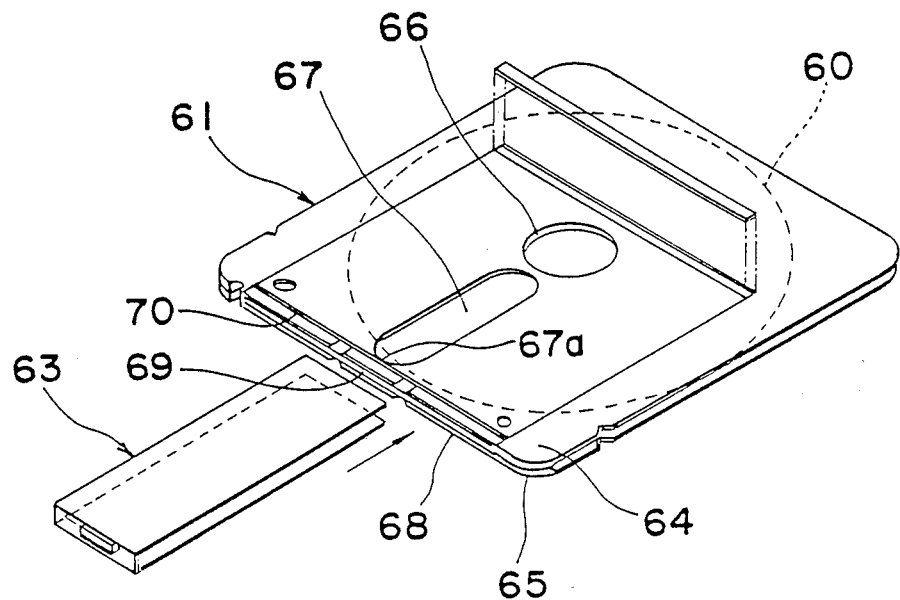
FIG. 3 is a perspective view of a conventional disc cartridge.
Figure 4:
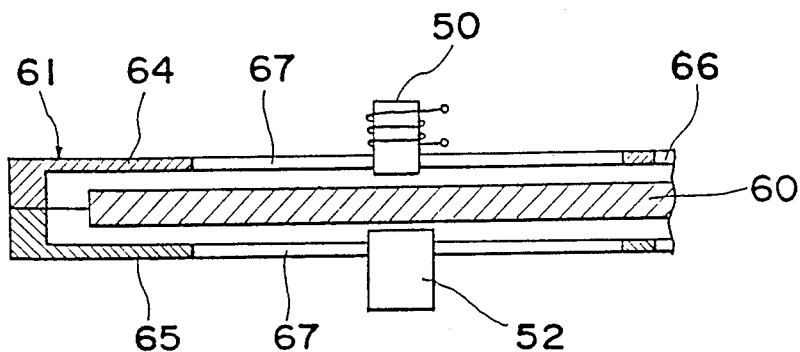
FIG. 4 is a cross sectional view of a conventional disc cartridge showing the condition that an electromagnetic coil and a lser ahead are arranged facing surfaces of a magnetic recording medium of the conventional disc cartridge.
Figure 5:
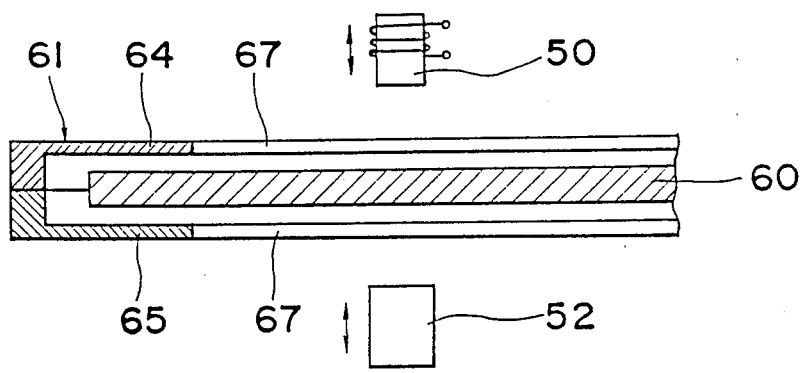
FIG. 5 is a cross sectional view of a conventional disc cartridge showing the condition that an electromagnetic coil and a laser head are moved up and down.
Figure 6:
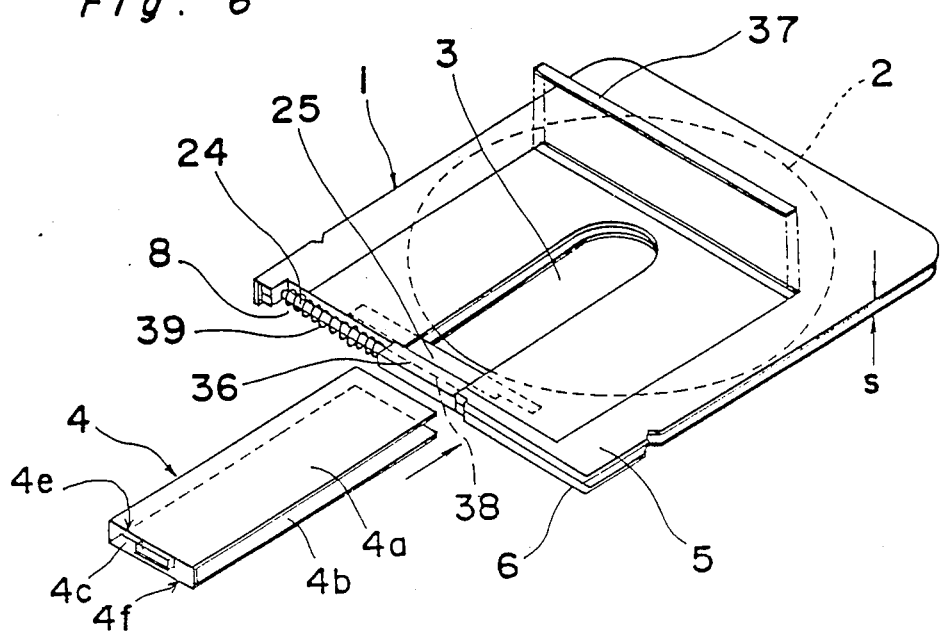
FIG. 6 is a perspective view of a first preferred embodiment of a disc cartridge according to the present invention.

Referring to FIG. 6, a first preferred embodiment of a disc cartridge according to the present invention will be described. The disc cartridge comprises a cartridge case 1 made of a synthetic resin, a recording disc 2 rotatably mounted in the cartridge case 1, and a shutter 4 slidably mounted on the cartridge case 1 for opening and shutting window holes 3 defined in top and bottom halves 5 and 6 of the cartridge case 1. The cartridge case 1 is formed by the top half 5 and the bottom half 6 as shown in FIG. 6, wherein both of the halves 5 and 6 are connected by a plurality of connecting screws (not shown). A space for arranging the recording disc 2 and the other required members is formed by connecting the top and the bottom halves 5 and 6. Each of the bottom half 6 and the top half 5 is formed of the generally same shape, the details thereof mentioned hereinafter only with respect to the bottom half 6.

Figure 7:
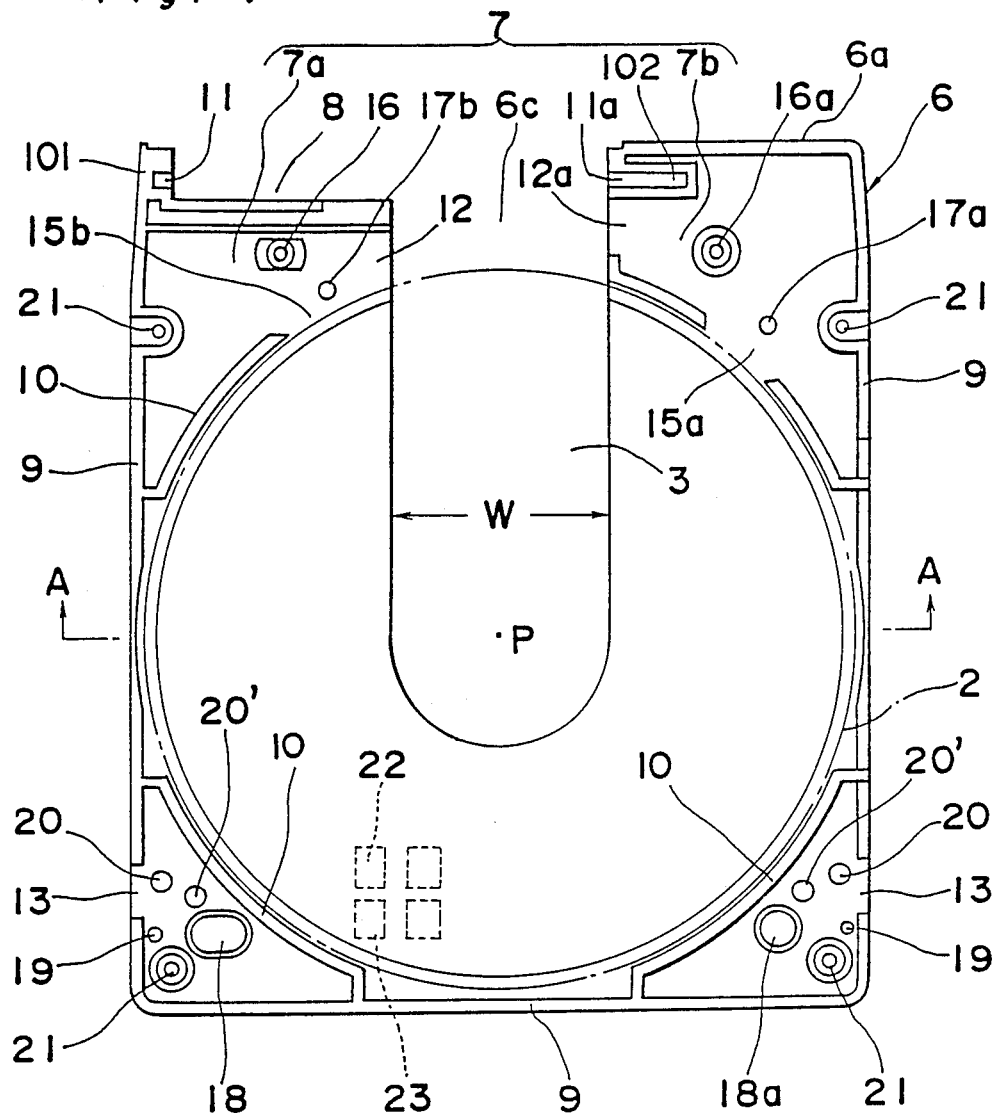
FIG. 7 is a plane view of a bottom half of the disc cartridge shown in FIG. 6.

As shown in FIG. 7, the window hole 3 is defined by an elongated shape in the bottom half 6 extending from the center portion of the bottom half 6, corresponding to a rotation center P of the recording disc 2, to a front edge 6a of the bottom half 6, thereby opening the front edge 6a as indicated by 6c. Thus, a portion 7 of the bottom half 6 is separated to two sub portions 7a and 7b by the window hole 3 so that a pair of side portions 101 and 102, as well as a pair of side portions 12 and 12a (referred to as the recess portions 12 and 12a hereinafter), are mutually separated from each other by the window hole 3, respectively. The front edge 6a of the bottom half 6 means the leading edge of the disc cartridge when the disc cartridge is inserted into a recording and play back device (not shown). An engagement portion 8 for mounting a slider 36 for arranging a shutter 4 described below in detail is formed in the sub portion 7a of the portion 7. The engagement portion 8 is formed by cutting at one edge portion of each of the top and the bottom halves 5 and 6. The window hole 3 has a width W so that a spindle for rotating the recording disc 2, a magnetic coil or a magnetic head and a laser head for recording and playing back an information signal to and from the recording disc 2 can be inserted into the window hole 3.

Figure 8:
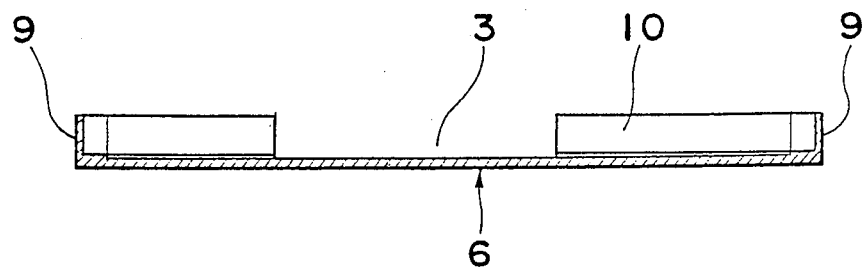
FIG. 8 is a cross sectional view of the bottom half on line of A—A of FIG. 7.

As shown in FIGS. 7 and 8, walls 9 for connecting the halves 5 and 6 are formed vertically in the bottom half 6 at the outer rim portion of the bottom half 6, wherein the connecting walls 9 have a uniform height. A plurality of partition walls 10 for separating the halves from the recording disc 2 are formed vertically on the bottom half 6 at the outside of the circumference of the recording disc 2 in an arcuate shape conforming to the part of the periphery of the recording disc 2, wherein the partition walls 10 have the same height as the height of the walls 9. A groove 11 for engaging with one end portion of a first reinforcement member 24, described below in detail is formed at the wall 9 in the sub portion 7a of the portion 7 and a groove 11a for engaging with the other end portion of the first reinforcement member 24 is formed in the wall 9 of the sub portion 7b, so that the grooves 11 and 11a are respectively formed in the side portions 101 and 102 corresponding to both sides of the engagement portion 8 for the slider 36. Recess portions 12 and 12a for engaging with end portions of a second reinforcement member 25 are formed at the slightly inner portion of the bottom half 6 with respect to the portions where the grooves 11 and 11a are formed. Further recess portions 13 for controlling a write protector 33, described below in detail are formed at the wall 9 at almost the rear part of the left and right side portions of the bottom half 6, in FIG. 7. Cut portions 15a and 15b are formed at the wall 10 so that a disc roller 9 (not shown) can project into the inside portion of the wall 10 so as to connect the recording disc 2.

In FIG. 7, screw holes 16 and 16a are provided for fixing the second reinforcement member 25 (FIG. 10) on the bottom half 6 and formed at the recess portions 12 and 12a, respectively, recess holes 17a and 17b are provided for supporting the disc roller and formed adjacent to the cut portions 15a and 15b, respectively, and through holes 18 and 18a are provided for positioning the disc cartridge on the recording and play back device and formed adjacent to the recess portions 13. Recess holes 19 are provided for arranging the write protectors 33 (FIG. 12) and formed adjacent to the recess portions 13, write protector holes 20 are formed adjacent to the recess portions 13, and four screw holes 21 are provided for connecting the top and the bottom halves 5 and 6 at the round corner portion of the bottom half 6. A piece of reflecting paper 22 is provided for distinguishing a surface A from a surface B of the disc cartridge, stuck on the surface of the bottom half 6, and a piece of reflecting paper 23 is provided for distinguishing the kind of recording disc 3 mounted in the disc cartridge and stuck on the surface of the bottom half 6 adjacent to the reflecting paper 22.

On the other hand, the top half 5 is formed so as to be similar to the bottom half 6 provided that each of members at the top half 5 are respectively formed symmetrically to the corresponding member formed in the bottom half 6.

The first cylindrical reinforcement member 24 is made of an elongated metal bar as shown in FIG. 9, wherein the diameter d of the member 24 is smaller than the thickness of the cartridge case 1 and is preferbly equal to or smaller than the thickness of the recording disc 2. The end portions of the first cylindrical reinforcement member 24 are respectively inserted into the grooves 11 and 11a as shown in FIG. 6 when both of the bottom and the top halves 5 and 6 are connected.

The second reinforcement member 25 is made of a hard synthetic resin in the shape of a flat plate having a similar harness to the synthetic resin material of which the top and the bottom halves 5 and 6 are made as shown in FIG. 10, wherein the thickness t of the memer 25 is smaller than the thickness S of the cartridge case 1 and is preferably equal to or smaller than the thickness of the recording disc. Both end portions of the second reinforcement member 25 are respectively inserted into the recess portions 12 and 12a as shown in FIG. 6, when both the bottom and the top halves 5 and 6 are connected.

Figure 13:
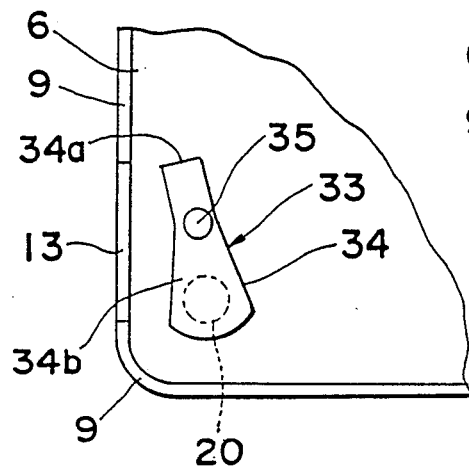
Figure 14:
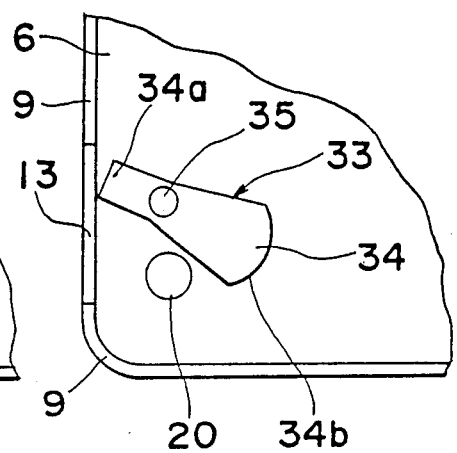

The write protector 33 is formed by a plate 34 being consisted of a sector portion 34b for shutting the write protector hole 20 and a rectangular portion 34a has shown in FIG. 12, wherein a support shaft 35 is mounted at about the center of the plate 34, projecting above and below the plate 34, and the shaft 35 is inserted into the recess hole 19 for arranging the write protector 33 and is rotatably engaged with the recess hole 19, so that the rotation of the plate 34 can open and shut the write protector hole 20. For example, when the end portion of a cylindrical member, such as a ball-point pen etc., is inserted into the recess portion 13 corresponding to the through hole for rotating the write protector 33 and mounted at one portion of the wall 9 for connecting both of the top and the bottom halves 5 and 6, and the end portion of the cylindrical member pushes the rectangular portion 34a of the plate 34 through the recess portion 13, the write protector hole 20 is shut by the sector portion 34b of the plate 34, as shown in FIG. 13. Then, a detecting device mounted in the recording play back device can not be inserted into the write protector hole 20, and the writing operation into the recording disc is inhibited. On the other hand, when the sector portion 34b of the plate 34 is pushed through the recess portion 13 by the end portion of the cylindrical member, the write protector hole 20 is opened by the rotation of the plate 34, thereby the detecting device arranged at the recording and play back device can be inserted into the write protector hole 20, and the inhibition of the write operation is canceled.

The structure of the shutter 4 (FIG. 6) will be described in detail below. The shutter 4 is made of a thin metal plate, such as stainless steel etc., and is formed in almost U shape but with sharp right-angled fold edges 4e and 4f by folding the metal plate, wherein the shutter 4 is consisted of top and bottom members 4a and 4b having a length which can respectively cover the whole of the window hole 3 of the cartridge case 1, and a connecting member 4c which connects the top and the bottom members 4a and 4b together. A slider 36 described below in detail is mounted onto the connecting member 4c of the shutter 4, and the slider 36 on which the connecting member 4c of the shutter 4 is thus mounted is mounted on the first cylindrical reinforcement member 24 which is inserted into the hole 38 of the slider 36, so that the top and the bottom members 4a and 4b of the shutter 4 cover both of the surfaces of the cartridge case 1, respectively. Then, the shutter 4 is mounted by sticking thin and long pushing plates 37 both of the surfaces of the cartridge case 1 so as to cover the end portions of the top and the bottom member 4a and 4b of the shutter 4.

As shown in FIG. 11, the slider 36 is made of a slidable synthetic resin material such as nylon or polyacetal etc. and is formed in a rectangular body shape so as to engage with the engagement portion 8 formed at the sub portion 7a of the portion 7 of the top and the bottom halves 5 and 6, wherein a through hole 38 is formed at the center portion in the longitudinal direction of the slider 36. The slider 36 is slidably mounted along the portion 7 of the cartridge case 1 corresponding to the insertion side of the cartridge case 1 into the recording and play back device by inserting the first reinforcement member 24 into the through hole 38 of the slider 36, as shown in FIG. 6. In FIG. 6, a back spring 39 is mounted winding the first reinforcement member 24 so as to spring the slider 36 to the round center portion of the portion 7. The recording disc 2 is the conventional optical magnetic disc and is mounted in the inside of the wall 10 of both of the halves 5 and 6, rotatable only when in use.

In the first embodiment of the disc cartridge shown in FIGS. 6 and 7, the center portion of the portion 7 of the disc cartridge is made open by the window hole 3, and the disc cartridge comprises a first reinforcement member 24 having a smaller diameter than the thickness of the cartridge case 1 and a second reinforcement member 25 having a smaller thickness than the thickness of the cartridge disc 1. Therefore, the electromagnetic coil 50 and the laser head 52 arranged facing together at a predetermined spacing are inserted at the portion 7 of the disc cartridge into the inside of the cartridge disc 1, wherein the portion 7 of the disc cartridge corresponds to the insertion side portion of the disc cartridge into the recording and play back device where the first and the second reinforcement members 24 and 25 are mounted between the sub portions 7a and 7b of the portion 7 of the disc cartridge. Accordingly, it is not necessary for the electromagnetic coil 50 and the laser head 52 to move up and down the window hole 3 formed on both of the surfaces of the cartridge case 1, resulting in that the recording and play back device comprising the electromagnetic coil 50 and the laser head 52 can be made smaller than the conventional recording and play back device and the electromagnetic coil 50 and the laser head 52 are positioned more precisely with respect to the recording disc 2 of the disc cartridge. In addition, in the first embodiment of the disc cartridge shown in FIGS. 6 and 7, the spindle insertion hole for inserting the spindle for rotating the recording disc 2 and the window hole for inserting the electromagnetic coil 50 and the laser head 52 for writing and reading an information signal into and from the recording disc 2 are formed continuously as the one window hole 3, thereby the electromagnetic coil 50 and the laser head 52 can be arranged adjacently together, resulting in that the recording density can be improved and the disc cartridge comprising the recording disc 2 can store a larger quantity of information than can the aforementioned conventional disc cartirdge 61.

The subject matter of the present invention is that the center position of the portion 7 is made open corresponding to the insertion side of the disc cartridge into which the recording and play back device are inserted, and the reinforcement members 24 and 25, having a diameter and thickness respectively smaller than the thickness of the cartridge case 1, are mounted between the sub portions 7a and 7b of the portion 7 of the cartridge case 1, while, the spindle insertion hole for inserting the spindle and the head insertion hole for inserting the electromagnetic coil 50 and the laser head 52 coinciding.

In the aforementioned first embodiment of the disc cartridge, only one case wherein the opticalmagnetic disc is used as the recording disc 2 is described above, however, the subject matter of the present invention need not be limited to this case, and the disc cartridge according to the present invention can be widely applied to a disc cartridge comprising any type recording disc such as other types of optical discs etc.

Figure 17:
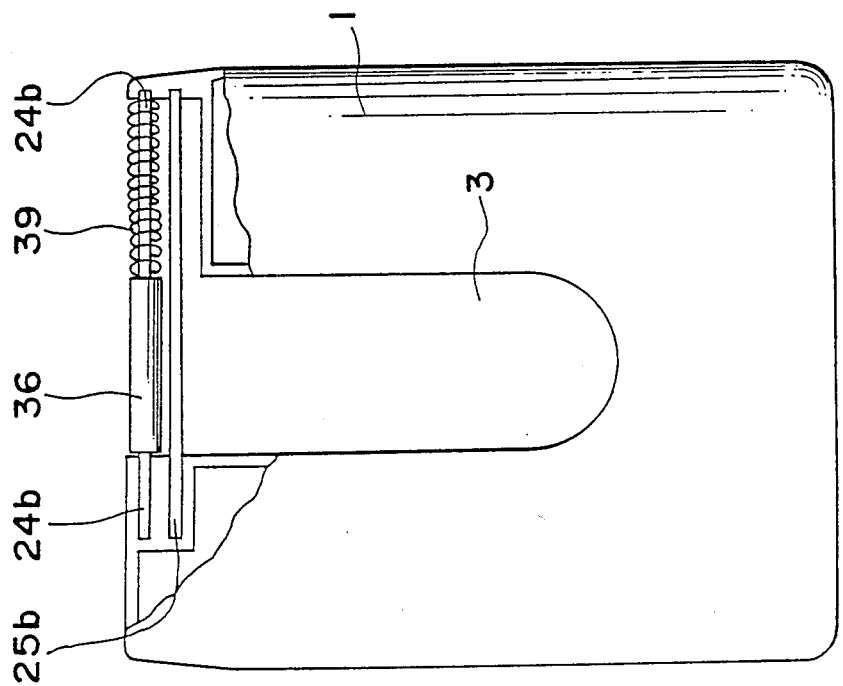
FIG. 17 is a partial cross sectional view of a fourth preferred embodiment of a cartridge case according to the present invention.

In the aforementioned first embodiment of the disc cartridge, the first cylindrical reinforcement member 24 made of metal is mounted along the portion 7 of the cartridge case 1 corresponding to the insertion portion of the disc cartridge into the recording and play back device, the second reinforcement member 25 made of a hard synthetic resin in the shape of the flat plate is mounted at the inside of the portion where the first reinforcement member 24 is mounted, however, the subject matter of the present invention need not be so limited. As shown in FIG. 17, a second reinforcement member 25c made of a hard synthetic resin in the shape of a flat plate may be mounted along the portion 7 of the cartridge case 1 corresponding to the insertion side of the disc cartridge for insertion into the recording and play back device, and a first cylindrical reinforcement member 24c made of metal may be mounted at the inside of the portion where the second reinforcement member 25c is mounted.

Figure 15:
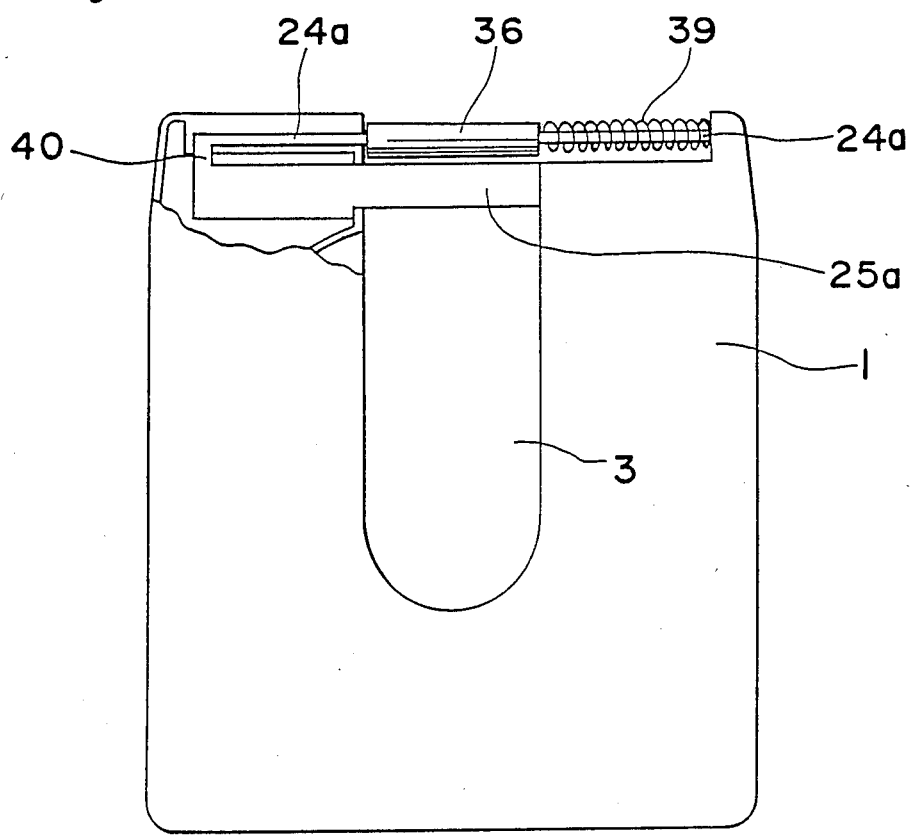
FIG. 15 is a partial cross sectional view of a second preferred embodiment of a cartridge case according to the present invention.

As shown in FIG. 15, a reinforcement member 40 made of a hard synthetic resin comprising a first cylidrical reinforcement portion 24a and a second reinforcement portion 25a may be mounted as one body along the portion 7 of the cartridge case 1.

Figure 16:
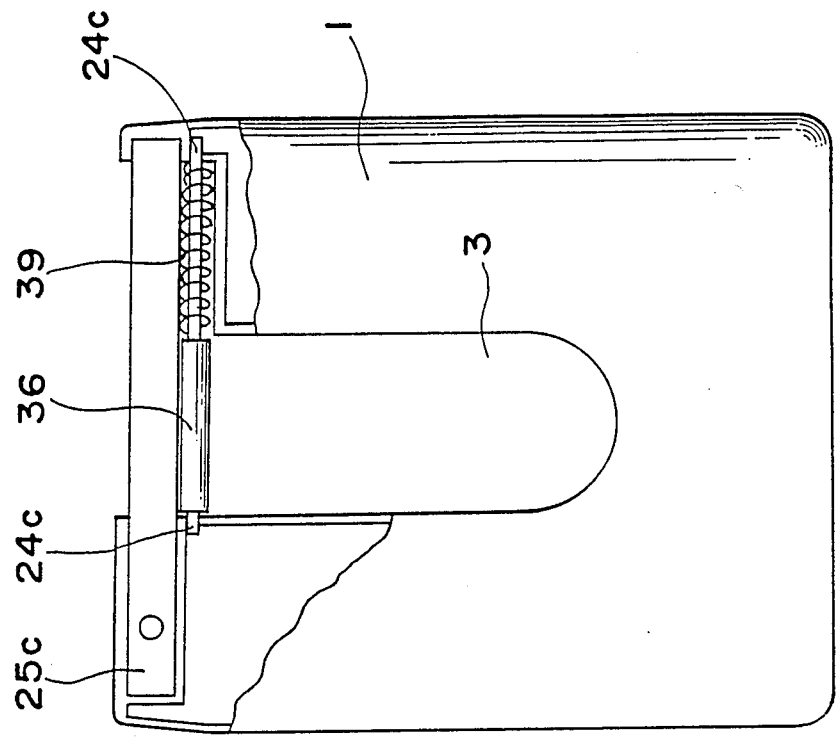
FIG. 16 is a partial cross sectional view of a third preferred embodiment of a cartridge case according to the present invention.

Moreover, as shown in FIG. 16, a first cylindrical reinforcement member 24b made of metal may mounted along the portion 7 of the cartridge case 1, and a second cylindrical reinforcement member 24a made of metal may be mounted at the inside of the portion where the first cylindrical reinforcement member 24b is mounted.

Figure 18:
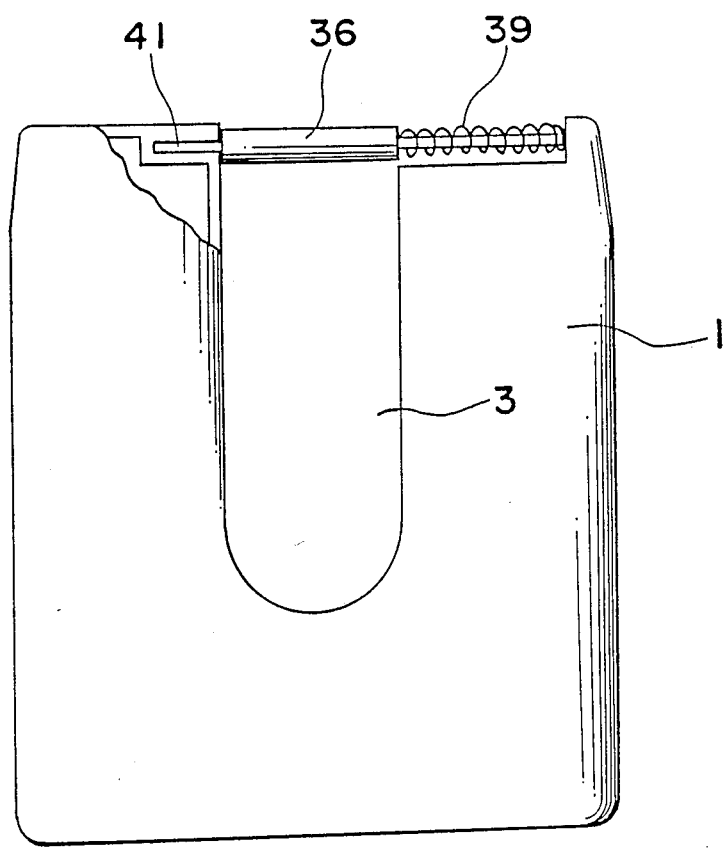
FIG. 18 is a partial cross sectional view of a fifth preferred embodiment of a cartridge case according to the present invention.

The number of the aforementioned reinforcement members may not be limited to two, and any number of reinforcement members can be mounted along the portion 7 of the cartridge case 1. FIG. 18 shows a preferred embodiment of a disc cartridge where only one reinforcement member 41 is mounted, wherein the cylindrical reinforcement member 41 made of metal is mounted along the portion 7 of the cartridge case 1. Moreover, a reinforcement member 41R made of a hard synthetic resin may be mounted as alternative to the cylindrical reinforcement member 41 made of metal.

In addition, in the aforementioned preferred embodiments shown in FIGS. 15 to 18, the slider 36 may be respectively mounted onto the reinforcement members 24a, 24b, 24c and 41 so as to insert the reinforcement members into the hole 38 of the slider 36, and also the spring 39 may be respectively mounted winding the reinforcement members 24a, 24b, 24c and 41, moreover, the shutter 4 may be mounted onto the slider 36.

Figure 19:
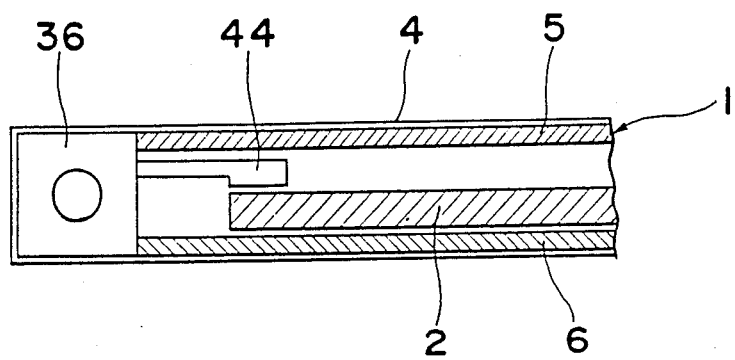
FIGS. 19 and 20 are partial cross sectional views of the other preferred embodiments of the cartridge case showing a slider where disc pushing members are arranged.
Figure 20:
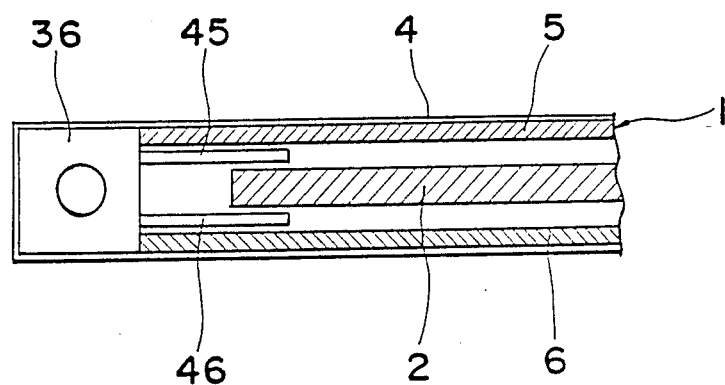

In the aforementioned first preferred embodiment of the disc cartridge according to the present invention, no member for limiting the movement of the recording disc 2 in the disc cartridge is arranged, however, the subject matter of the present invention need not be limited to this case. As shown in FIG. 19, a disc pushing member 44 can be mounted at the facing side of the slider 36 to the recording disc 2, so that the member 44 can face the outer rim portion of the recording disc 2 and can make the movement of the recording disc 2 stop when the shutter 4 stops shutting the window hole 3, on the other hand, so that the member 44 can separate from the outer rim portion of the recording disc 2 when the shutter 4 stops opening the window hole 3. In this preferred embodiment, the recording disc 2 is positioned at a narrow spacing between the disc pushing member 44 and the bottom half 6, and the spacing between the recording disc 2 and the members 6 and 44 become narrower when the shutter 4 stops shutting the window hole 3, resulting in a smaller impact force onto the recording disc 2 and preventing breaking of the recording disc 2 than a disc cartridge not comprising the disc pushing member 44 when the disc cartridge is handled. Moreover, the number of the disc pushing member 44 may not be limited to only one and, as shown in FIG. 20, two disc pushing members 45 and 46 can be mounted at the facing side of the slider 36 to the recording disc 2. In this case, the recording disc 2 can be positioned between the two disc pushing members 45 and 46 and the recording disc 2 can be mounted at the center portion of the cartridge case 1, resulting in the advantage that the electromagnetic coil 50 and the laser head 52 can be more easily inserted into the inside of the disc cartridge than the conventional disc cartridge 61.

In the aforementioned preferred embodiments, the spacing between the reinforcement member mounted at the portion most adjacent to the recording disc 2 and the recording disc 2 may be preferably adjusted within the range of from 1 mm to 2 mm when the recording disc 2 is rotated.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A disc cartridge comprising
   a cartridge case formed by combining top and bottom halves,
   a disc shaped recording medium rotatably mounted between said top and bottom halves, each of said top and bottom halves having an elongated head insertion opening formed therein, one end thereof extending to a corresponding edge of each half of said cartridge case defining an open space at said edges to provide a pair of sub portions of each half on both sides of each head insertion opening,
   a spindle insertion hole formed at a center portion of each of said top and bottom halves,
   a shutter means mounted to said disc cartridge case slidably over said edge of said cartridge case for opening and closing said head insertion openings and said spindle insertion holes, and
   at least one reinforcement member having a diameter or a thickness smaller than the thickness of said cartridge case, said reinforcement member being mounted at both ends thereof to said cartridge case across said open space at said edge.

2. The disc cartridge as defined in claim 1, wherein said head insertion openings and said spindle insertion holes are continuously communicated.

3. The disc cartridge as defined in claim 1, wherein said shutter means is movable in only one of region existing on both sides of a line passing through the centers of said spindle insertion hole and said head insertion openings.

4. The disc cartridge as defined in claim 3, wherein said disc cartridge further comprises a slider slidably mounted on said reinforcement member, and a spacing portion whereby said shutter means is mounted onto said slider.

5. The disc cartridge as defined in claim 4, wherein said reinforcement member is exposed in said spacing portion when said disc cartridge is not in use.

6. The disc cartridge as defined in claim 1, wherein said shutter means closes said spindle insertion hole and said head insertion openings when then said disc cartridge is not in use.

7. The disc cartridge as defined in claim 1, wherein the diameter or thickness of said reinforcement member is equal to or smaller than the thickness of said recording medium.

8. The disc cartridge as defined in claim 1, wherein said reinforcement member comprises a plurality of reinforcement members having a diameter or thickness equal to or smaller than the thickness of said recording medium.

9. The disc cartridge as defined in claim 1, wherein said reinforcement member comprises a combination of a first cylindrical reinforcement member made of metal having a diameter equal to or smaller than the thickness of said recording medium and a second reinforcement member made of a hard synthetic resin in the shape of a flat plate having a thickness equal to or smaller than the thickness of said recording medium.

10. The disc cartridge as defined in claim 9, wherein said first reinforcement member is mounted in front of said second reinforcement member with respect to said edge of said cartridge between said sub portions.

11. The disc cartridge as defined in claim 9, wherein said second reinforcement member is mounted in front of said first reinforcement member with respect to said edge of said cartridge between said sub portions.

12. The disc cartridge as defined in claim 1, wherein said shutter means is mounted through a slider made of a slidable material onto a cylindrical reinforcement member made of metal.

13. The disc cartridge as defined in claim 1, wherein said reinforcement member is made of a hard synthetic resin and is formed by a cylindrical portion having a diameter equal to or smaller than the thickness of the recording medium and a plate portion having a thickness equal to or smaller than the thickness of said recording medium.

14. The disc cartridge as defined in claim 13, wherein said shutter means is mounted through a slider made of a slidable material onto the cylindrical portion of said reinforcement member.

15. The disc cartridge as defined in claim 1, wherein a spacing between said reinforcement member mounted at the portion most adjacent to said recording medium and said recording medium is adjusted with the range of from 1 mm to 2 mm when said recording medium is rotated.

16. The disc cartridge as defined in claim 1, wherein said reinforcement member is a reinforcement member in the shape of a flat shape made of a hard synthetic resin having a thickness equal to or smaller than the thickness of said recording medium.

17. The disc cartridge as defined in claim 1,
wherein said shutter means comprises a slider and a shutter member, said slider being slidably mounted to said at least one reinforcement member.

18. The disc cartridge as defined in claim 2,
wherein said head insertion opening has a U-shape portion and said reinforcement member is fixed to said cartridge case across an open end of said U-shaped head insertion opening.

19. A disc cartridge comprising:
(a) a cartridge case formed by combining a top and a bottom half each having an elongated head insertion opening and a spindle insertion hole;
(b) a disc shaped recording medium rotatably mounted in said cartridge case;
(c) shutter means mounted to said cartridge case for opening and calosing said head insertion openings and said spindle insertion holes; and
(d) at least one reinforcement member having a thickness smaller than a thickness of said cartridge case and formed at one edge of said cartridge case, one end portion of said head insertion opening being terminating at said reinforcement member.

20. The disc cartridge as defined in claim 19,
wherein another end portion of said insertion opening in each of said halves is continuously communicated with said spindle insertion hole.

21. The disc cartridge as defined in claim 19,
wherein said reinforcement member is integrally fixed at both ends thereof with said cartridge case.

22. The disc cartridge as defined in claim 19,
wherein said reinforcement member is made of the same material as that of said cartridge case.

23. The disc cartridge as defined in claim 19,
wherein said reinforcement member is made of a different material from that of said cartridge case.

24. The disc cartridge as defined in claim 21,
wherein said shutter means comprises a slider slidably mounted to said reinforcement member and a shutter member mounted to said slider so as to cover and uncover said head insertion openings and said spindle holes due to slide movement of said slider.

* * * * *